United States Patent
Hegyi

(10) Patent No.: US 9,441,917 B1
(45) Date of Patent: Sep. 13, 2016

(54) SHROUD AND METHOD FOR FIXEDLY COVERING A PIPE WITH A CAMOUFLAGE SCHEME USING THERMOPLASTIC SHRINK WRAP, HYDRO DIPPING, AND A MULTI-LAYERED PANEL

(71) Applicant: Jeffery D. Hegyi, Klamath Falls, OR (US)

(72) Inventor: Jeffery D. Hegyi, Klamath Falls, OR (US)

(*) Notice: Subject to any disclaimer, the term of this patent is extended or adjusted under 35 U.S.C. 154(b) by 0 days.

(21) Appl. No.: 14/683,519

(22) Filed: Apr. 10, 2015

Related U.S. Application Data

(60) Provisional application No. 61/982,396, filed on Apr. 22, 2014.

(51) Int. Cl.
*B32B 3/06* (2006.01)
*F41H 3/00* (2006.01)
*B29C 65/48* (2006.01)
*B29L 23/00* (2006.01)

(52) U.S. Cl.
CPC ............... *F41H 3/00* (2013.01); *B29C 65/48* (2013.01); *B29L 2023/22* (2013.01); *Y10T 428/2481* (2015.01); *Y10T 428/24793* (2015.01); *Y10T 428/24802* (2015.01)

(58) Field of Classification Search
CPC ........... F41H 3/00; F41H 3/02; B29C 65/48; B29C 63/40; B29C 63/42; B29C 63/0056; B29L 2023/22; Y10T 428/24802; Y10T 428/2481; Y10T 428/24793; Y10T 428/139; Y10T 428/919
USPC ................ 428/100, 101, 99, 195, 196, 919; 29/525.11, 525.01; 156/60, 84, 192
See application file for complete search history.

(56) References Cited

U.S. PATENT DOCUMENTS

| | | |
|---|---|---|
| 4,748,061 A | 5/1988 | Vesley |
| 5,066,529 A | 11/1991 | Huber et al. |
| 5,130,496 A | 7/1992 | Jenkins |
| 5,778,590 A | 7/1998 | Browning et al. |
| 5,895,288 A | 4/1999 | Nelson |
| 7,051,839 B1 | 5/2006 | George |
| 7,476,438 B2 | 1/2009 | Gorres |
| 7,807,928 B1 | 10/2010 | Tate |
| 8,129,620 B2 | 3/2012 | Schorr, III et al. |
| 2001/0013212 A1 | 8/2001 | Jimenez Sanchez et al. |
| 2005/0058816 A1 | 3/2005 | Gorres |
| 2005/0136820 A1 | 6/2005 | Von Gunten |
| 2005/0161145 A1 | 7/2005 | Record |
| 2010/0012216 A1 | 1/2010 | Salatina et al. |
| 2012/0068452 A1 | 3/2012 | Boettner |
| 2013/0164469 A1 | 6/2013 | Artmann |

*Primary Examiner* — Ruiyun Zhang
(74) *Attorney, Agent, or Firm* — Jerry Haynes Law

(57) ABSTRACT

A shroud and method for fixedly covering a pipe with a camouflage scheme using thermoplastic shrink wrap, hydro dipping, or multi-layered panels. The shroud serves to securely and permanently encapsulate a substantial portion of a pipe with a camouflage scheme to make the pipe less conspicuous by blending in with the environment. Fastening mechanisms, including hook and loop fasteners, magnets, adhesives, and frictional fittings are used to fasten an inner fastening film of the shroud to an external surface of the pipe. The shroud further includes an outer film having a camouflage scheme, such as mottled camouflage. The color and pattern display on the camouflage scheme creates a visual effect that integrates the pipe with external or interior environment. In this manner, the pipe is less visible. The camouflaging effect is effective for enhancing the aesthetics of a garden, or hiding the pipe for strategic purposes.

14 Claims, 4 Drawing Sheets

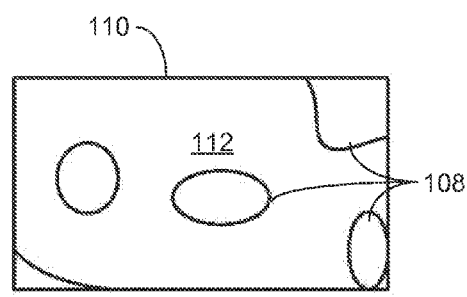
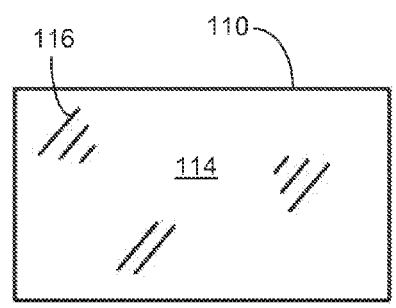
FIG. 3A	FIG. 3B
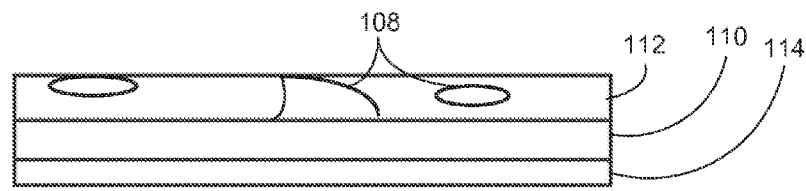
FIG. 4

SHROUD AND METHOD FOR FIXEDLY COVERING A PIPE WITH A CAMOUFLAGE SCHEME USING THERMOPLASTIC SHRINK WRAP, HYDRO DIPPING, AND A MULTI-LAYERED PANEL

CROSS REFERENCE OF RELATED APPLICATIONS

This application claims the benefits of U.S. provisional application No. 61/982,396, filed Apr. 22, 2014 and entitled SYSTEM AND METHOD FOR CAMOUFLAGING PIPES, which provisional application is incorporated by reference herein in its entirety.

FIELD OF THE INVENTION

The present invention relates generally to a shroud and method for fixedly covering a pipe with a camouflage scheme. More so, the shroud and method for fixedly covering a pipe with a camouflage scheme permanently attaches a camouflage scheme on the external surface of a pipe to inhibit removal of the shroud from the pipe and also makes the pipe less conspicuous in an environment, generally using thermoplastic shrink wrap or hydro dipping techniques or a multi-layered panel.

BACKGROUND OF THE INVENTION

The invention will now be described, by way of example, with reference to the accompanying drawings, in which:

Typically, PVC pipes are used to transport fluids from a fluid source to an outlet. The piping must often cross large areas to carry the fluid. Typically, this involves crossing environments with animals, mountains, and unregulated areas.

It is known that in the water distribution market, PVC pipes accounts for most fresh water and sanitary sewer pipe applications. The pipe is light weight, low cost, and low maintenance; thereby making it an attractive solution for transporting water. The pipe is, however, usually white, and thereby very visible. Also, the pipe is susceptible to cracking when a force is applied to it. Thus it must be strategically placed and installed to ensure longitudinal cracking and overbelling does not occur.

Furthermore, the pipe may create an undesirable visual effect in the environment. For example, the pipe may have a color or texture that detracts from the aesthetics or functionality of the environment. This is especially true in a garden or domestic area.

There have been attempts to visually conceal the pipe so as to avoid the aforementioned problems of molestation or visual aesthetics. The prior art has utilized the use of camouflage spray paints that attempt to blend the pipe in with the environment. Such camouflage spray paints are specially adapted to produce a finish having an uneven pattern of various colors. Although camouflage spray paint can be used on virtually all items, use of this method also presents several disadvantages. Perhaps the most significant disadvantage is that once applied, spray paint cannot be removed without damaging the original finish of the item.

Another attempted solution involves the use of slip-on camouflaged textile materials such as socks or sleeves. An advantage of using this type of pipe camouflaging method is that the camouflage can quickly be removed from and replaced on a particular item. These devices are, however, bulky and absorb water. Additionally, the slip-on devices often become unraveled and can easily be snagged or removed by wildlife and cattle.

Accordingly, a shroud for fixedly covering a pipe with a panel having a camouflage scheme, which makes the pipe less susceptible to detachment from the pipe, and less conspicuous in the environment may be desirable for some applications.

SUMMARY OF THE INVENTION

Illustrative embodiments of the disclosure are generally directed to a shroud and method for fixedly covering a pipe with a camouflage scheme using thermoplastic shrink wrap, hydro dipping methods, or multi-layered panel. The shroud serves to securely and permanently encapsulate a substantial portion of a pipe with a camouflage scheme to make the pipe less conspicuous by blending in with the environment. Various fastening mechanisms, including hook and loop fasteners, magnets, adhesives, and frictional fittings may be used to fasten an inner fastening film of the shroud to an external surface of the pipe. In this manner, the camouflage scheme cannot be removed from the pipe easily. The present invention utilizes thermal shrink wrap or hydro dipping techniques or a multi-layered panel to apply the camouflage scheme to the pipe.

In one possible embodiment, the shroud may include an outer film having a camouflage scheme of a color or pattern, such as mottled camouflage. The color and pattern display on the camouflage scheme creates a visual effect that integrates the pipe with external or interior environment. In this manner, the pipe is less visible. The camouflaging effect is effective for enhancing the aesthetics of a garden, or hiding the pipe for strategic purposes.

An illustrative embodiment of the shroud includes: a panel, the panel defined by a an outer surface, an inner surface, top edge, a bottom edge, and a pair of sidewalls extending between the top edge and the bottom edge; an outer film, the outer film disposed to detachably overlay the outer surface of the panel, the outer film comprising a camouflage scheme, the camouflage scheme defined by a color and a pattern configured to create a visual effect; and an inner fastening film, the inner fastening film disposed to fixedly overlay the inner surface of the panel, the inner fastening film comprising a fastening mechanism configured for enabling fixed attachment.

BRIEF DESCRIPTION OF THE DRAWINGS

The invention will now be described, by way of example, with reference to the accompanying drawings, in which:

FIGS. 3A and 3B illustrate sectioned side views of the panel, in accordance with an embodiment of the present invention;

FIG. 4 illustrates a top view of an exemplary panel, an outer film having a camouflage scheme.

Like reference numerals refer to like parts throughout the various views of the drawings.

DETAILED DESCRIPTION OF THE INVENTION

Figure 1:
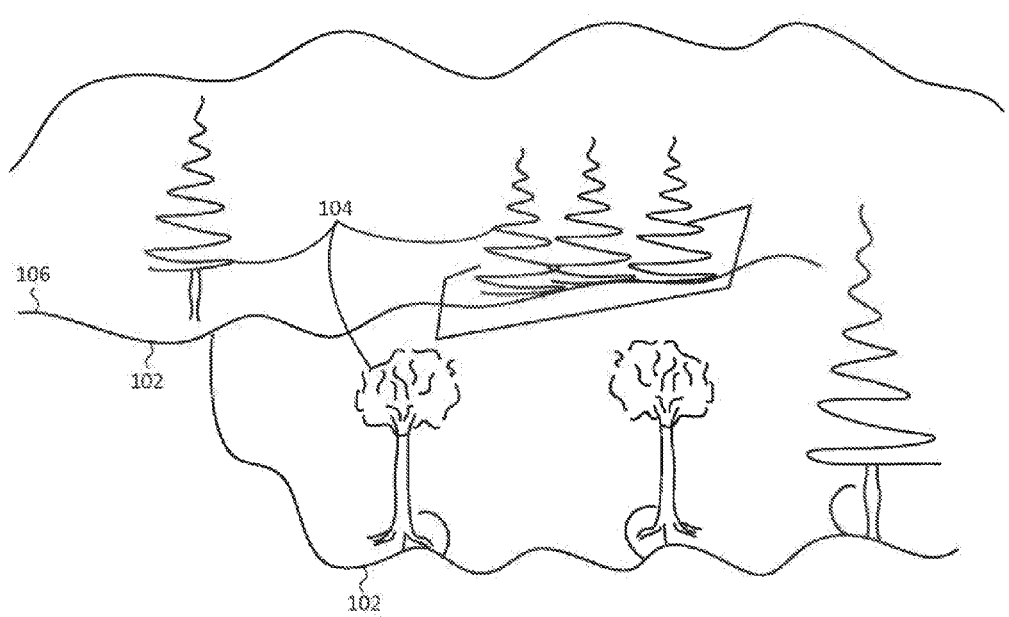
FIG. 1 illustrates a wide angle view of an exemplary pipe crossing an exemplary environment, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

The present invention discloses a shroud 100 and method 200, referenced in FIGS. 1-5, that fixedly covers a pipe 102 with a camouflage scheme 108 using a thermoplastic shrink wrap, or a hydro dipping technique, or a multi-layered panel 110. The camouflage scheme 108 permanently attaches to the external surface of the pipe 102 while forming camouflaging patterns and colors that make the pipe 102 less conspicuous in an environment 104. In some embodiments, the shroud 100 may be used to fixedly cover a pipe 102 used for horticultural, home garden, home landscape, or large farm applications.

In some embodiments, the shroud 100 serves to securely and permanently encapsulate a substantial portion of the external surface of the pipe 102 with a camouflage scheme 108. The camouflage scheme 108 is configured to make the pipe 102 less conspicuous by enabling the pipe 102 to visually blend in with the environment 104. Various fastening mechanisms 116, including hook and loop fasteners, magnets, adhesives, and frictional fittings may be used to fasten an inner fastening film 114 of the shroud 100 to an external surface (not shown) of the pipe 102. In this manner, the camouflage scheme 108 cannot be removed from the pipe 102 easily. For example, animals cannot chew or pull the shroud off the pipe 102; adverse weather cannot blow or slide the shroud 100 off the pipe 102; and accidents cannot easily dislodge the shroud 100 from the pipe 102.

As referenced in FIG. 1, the pipe 102 may be positioned and oriented in an environment 104, such as a yard or garden area. In some instances, the pipe 102 may create an undesirable visual effect in the environment 104. For example, the pipe 102 may comprise a color or texture that detracts from the aesthetics or functionality of the environment 104. The shroud 100 provides a camouflage scheme 108 that covers an exterior surface of the pipe 102 to help blend the pipe 102 in with the environment 104, and consequently enhance the aesthetics thereto.

In one embodiment, the pipe 102 comprises a length of piping, tube, or channel configured to carry a fluid between at least two points. The pipe 102 may include a linear length of piping, a junction point, and any fittings that join a plurality of pipe. The pipe 102 may be configured to carry pressurized and treated fresh water from an exterior fluid source 110 to the interior of buildings. The pipe 102 may also be utilized outdoors for landscaping, irrigation, animal husbandry, hunting, and sporting games. In one possible embodiment, the pipe 102 is used for feeding plants and landscape by carrying water from a water supply.

Suitable materials for the pipe 102 may include, without limitation, polyvinyl chloride (PVC), ductile iron, steel, cast iron, polypropylene, polyethylene, copper, or lead. The pipes 102 may include, without limitation, PVC pipes, poly pipes, vinyl pipes, rubber pipes, and copper pipes. In one embodiment, the pipe 102 may encompass any length or diameter pipe, including from $3/16$" to 2" PVC pipe. In one possible embodiment, the pipe 102 may be configured for performing hydro dripping techniques of irrigation.

Figure 2:
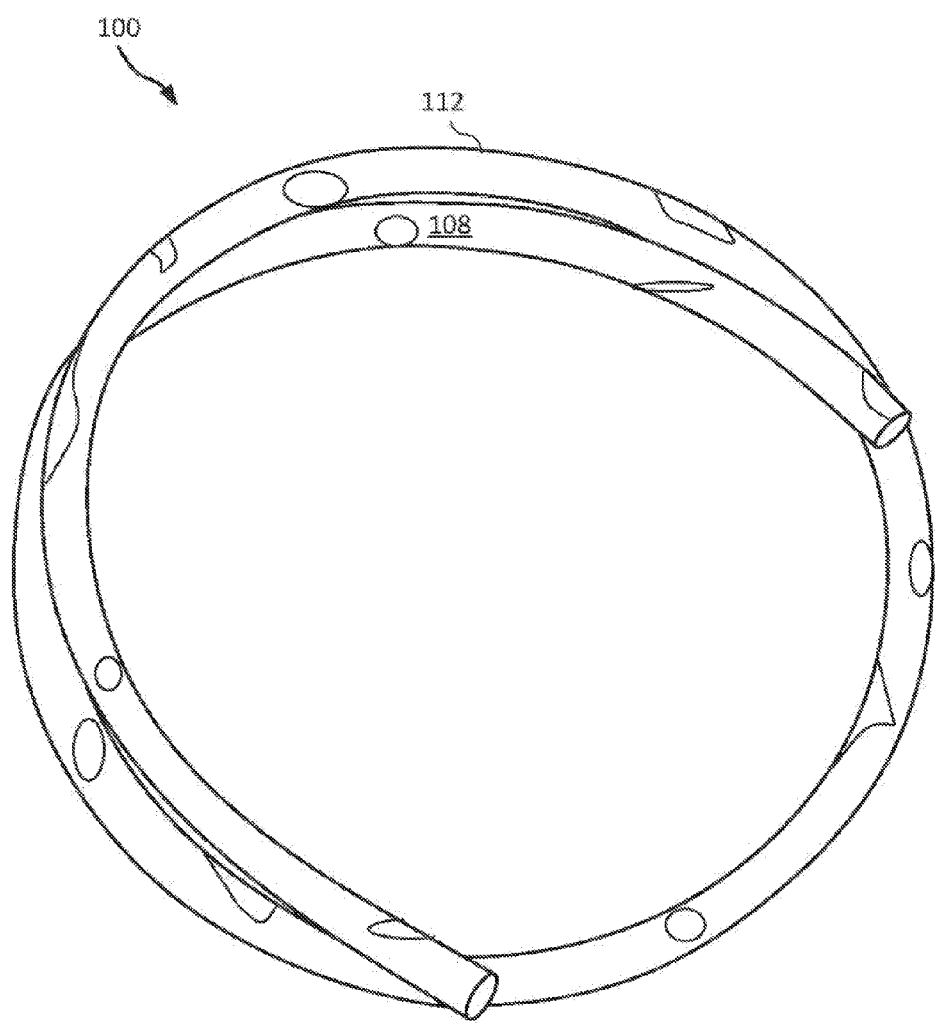
FIG. 2 illustrates a perspective view of an exemplary shroud having an exemplary camouflage scheme fixedly covering an exemplary pipe, in accordance with an embodiment of the present invention.

An illustrative embodiment of the shroud 100 in FIG. 2 shows a panel 110 having a generally resilient characteristic for facilitated conformance to variously sized and dimensioned pipes. The panel 110 may be configured to coil around the pipe 102. In other embodiments, the panel 110 may, however, be configured to slide onto the pipe 102, like a sleeve. Suitable materials for the panel 110 may include, without limitation, vinyl, polyvinyl chloride, rubber, flexible polymers, and a cloth tape coated with a poly-ethylene resin.

In another possible embodiment, the panel 110 is a thermoplastic shrink wrap provided with a camouflage scheme 108. The thermoplastic shrink wrap comprises a thermoplastic shrink wrap, the thermoplastic shrink wrap configured to enable at least partial wrapping around a pipe. The thermoplastic shrink wrap may include an outer surface defined by a camouflage scheme 108, and an inner surface configured to enable heat activated adherence to the pipe 102.

In one exemplary embodiment, each piece of shrink-wrap is positioned around a portion of the pipe 102 to be camouflaged and is then heat-shrunk to constrict the piece of shrink-wrap around the portion of the pipe 102. Once shrunken by applying heat, excess portions of the shrink-wrap can be easily trimmed away, thereby provided a professional-looking camouflage finish. The panel 110 may, however, also include other types of material composition and techniques for securely applying to the pipe 102. In any case, the panel does not, however, easily detach from the pipe 102, such that the camouflage scheme 108 remains fixedly attached and visible from the pipe 102.

In yet another possible embodiment that fixedly adheres a camouflage scheme 108 on the pipe 102, a method for hydro dipping a shroud 100 to fixedly cover a pipe 102 with a printed design of a camouflage scheme 108 is utilized in the present invention. Similar to the multi-layered panel 110 and the thermoplastic shrink wrap, the hydro dipping method adheres a color and/or pattern configured to visually blend the exterior surface of the pipe 102 into the environment 104, and thereby make the pipe 102 less conspicuous in the environment 104.

Specifically, the hydro dipping method is effective for applying printed designs, such as the camouflage scheme 108 to three-dimensional surfaces, such as the pipe 102. In one embodiment, the method comprises an initial step of pretreating a pipe 102 with a base coat material. A next step includes gravure-printing a polyvinyl alcohol film with a camouflage scheme on the pipe 102. Those skilled in the art will recognize that gravure-printing is a type of intaglio printing process, which involves engraving the image onto an image carrier, such as the pipe 102. The polyvinyl alcohol film may include a water-soluble synthetic polymer having the idealized formula $[CH_2CH(OH)]_n$.

The pipe 102 is then immersed in hot water. Next, an activator film is sprayed on the polyvinyl alcohol film, wherein the activator film is configured to activate a bonding agent on the polyvinyl alcohol film. A final step comprises adhering the activator film around the pipe 102, wherein the camouflage scheme 108 is externally visible from on the pipe 102. The adhesion is a result of the chemical components of the activator softening the base coat layer and allowing the ink to form a bond with it. Those skilled in the art will recognize that one of the most common causes of a failure to achieve adhesion between the pipe 102 and the film is a poorly applied activator.

As shown in FIG. 3A, the shroud 100 may also include a multi-layered panel 110. The panel 110 is defined by an outer surface, an inner surface, top edge, a bottom edge, and a pair of sidewalls extending between the top edge and the bottom edge. The outer surface is oriented away from an external surface of the pipe 102, so as to be visible. The inner surface is more proximal to the external surface of the pipe 102. In some embodiments, the top edge, bottom edge, and sidewalls form a generally elongated shape that can easily encapsulate an elongated pipe 102. The panel 110 may be cut to any dimensions for conforming to variously sized and dimensioned pipes 102.

As referenced in FIG. 3A, the shroud 100 further comprises an outer film 112. The outer film 112 detachably overlays the outer surface of the panel 110. This interaction may include a weak adhesive engagement in which the outer film 112 easily peels on and off the outer surface of the panel 110. The outer film 112 is generally opaque and has a camouflage scheme 108, whereby the visual effect of the colors and patterns substantially cover the pipe 102. Suitable materials for the outer film 112 may include, without limitation, vinyl, polyvinyl chloride, rubber, flexible polymers, and a cloth tape coated with a poly-ethylene resin.

The outer film 112 is defined by the camouflage scheme 108, such as a color or pattern of mottled camouflage. The camouflage scheme 108 is defined by a color and a pattern configured to create a visual effect. The color and pattern displayed on the camouflage scheme 108 creates a visual effect that integrates the pipe 102 with external or interior environment 104. In this manner, the pipe 102 is less conspicuous in the environment 104. Those skilled in the art will recognize that the camouflaging effect is effective for enhancing the aesthetics of a garden, or hiding the pipe 102 for strategic purposes.

Those skilled in the art will recognize that the camouflaging effect is effective for enhancing the aesthetics of a garden, or hiding the pipe 102 for strategic purposes. In some embodiments, the camouflage scheme 108 may include a color and/or pattern that integrates the pipe 102 with external or interior environment 104. The camouflaging effect may be effective for enhancing the aesthetics of a garden, or hiding the pipe 102 for strategic purposes.

The camouflage scheme 108 may include a color and/or pattern configured to visually blend the exterior surface of the pipe 102 into the environment 104, and thereby make the pipe 102 less noticeable. In one embodiment, the camouflage scheme 108 is a single camouflaging color. In another embodiment, the camouflage scheme 108 includes a mottled, camouflage pattern. The camouflage scheme may be oriented in an alignment with the pipe 102 to optimize the camouflaging effect before fixedly attaching thereto.

In some embodiments, the camouflage scheme 108 may include a green or blue or tan colored camouflage finish, wood chips, desert look, Kentucky blue grass look, a lawn look, and any other exterior or interior color, shade, or pattern. The mottled or solid pattern and the solid camouflage color is configured to visually blend the pipe 102 into the structures, objects, landscaping, and the like in the environment 104 that are adjacent to the pipe 102.

In an alternative embodiment, the outer film 112 is a length of camouflage patterned tape having an outer tape surface painted with the camouflage scheme 108. The camouflage tape may include an inner tape surface coated with an adhesive. The camouflage tape may cover the pipe 102 by winding around the pipe 102, such that the inner tape surface engages the outer surface of the panel 110. In this manner, the pipe 102 has the visual appearance of being covered with the camouflage scheme 108.

In some embodiments, a camouflage film having substantially the same shape and size of the pipe 102 may cover the pipe 102. In yet another embodiment, the paint or camouflage composition, such as paint, is applied directly onto the exterior surface of the pipe with a brush or spray can. In any case, the panel 110 forms an external shell over the pipe to create a generally camouflaged, hidden effect, especially in environment 104 that matches the camouflage scheme 108.

As referenced in FIGS. 3B and 4, the shroud 100 further comprises an inner fastening film 114. The inner fastening film 114 fixedly overlays the inner surface of the panel 110, forming a coplanar arrangement. Thus, when the shroud 100 covers the pipe 102, the inner fastening film 114 is sandwiched between the inner surface of the panel 110 and the external surface of the pipe 102. Suitable materials for the inner fastening film 114 may include, without limitation, vinyl, polyvinyl chloride, rubber, flexible polymers, and a cloth tape coated with a poly-ethylene resin.

The inner fastening film 114 comprises a fastening mechanism 116 for enabling fixed attachment to the external surface of the pipe 102. Through the fastening mechanism 116, the shroud 100 may fixedly and securely attach to the pipe 102. In this manner, the shroud 100 is not easily detachable from the pipe 102. For example, animals are not able to dislodge the shroud 100 from the pipe 102 by chewing, scratching or grabbing. In another example, severe weather, such as hail, strong winds, and freezing temperatures cannot disrupt the integrity of the attachment between the inner fastening film 114 and the inner surface of the panel 110.

The fastening mechanism 116 used to form this secure attachment may include, without limitation, hook and loop fasteners, magnets, adhesives, screws, and frictional fittings. In one possible embodiment, the panel 100 is a drip line, hose or other types of hosting for the pipe 102. In one embodiment, the external surface of the pipe may have a corresponding fastener to fixedly mate with the fastening mechanism 116 of the inner fastening film 114. In one alternative embodiment, an outer fastener, such as a ring clamp may fasten the shroud 100 onto the exterior surface of the pipe 102. The outer fastener is configured to constrict the panel 110 into engagement with the pipe 102.

One objective of the shroud 100 is to create a generally camouflaged, hidden effect for the pipe, especially in an environment that matches the camouflage scheme.

Another objective is to camouflage a polyvinyl chloride (PVC) pipe used to carry a fluid from a fluid source 106.

Another objective is to make the camouflage scheme 108 a mottled, camouflage pattern.

Another objective is to provide a panel 110 with a resilient rubber or vinyl material composition.

Another objective is to provide a thermoplastic shrink wrap for fixedly wrapping around the pipe 102.

Another objective is to provide a hydro dipping method for fixedly adhering a camouflage scheme 108 on the pipe 102.

Another objective is to provide a fastening mechanism 116 that includes at least one member selected from the group consisting of: hook and loop fasteners, magnets, adhesives, screws, and frictional fittings.

Another objective is to provide a pipe 102 that positions across an environment, such as a yard, a field, mountains, and a body of water.

Figure 5:
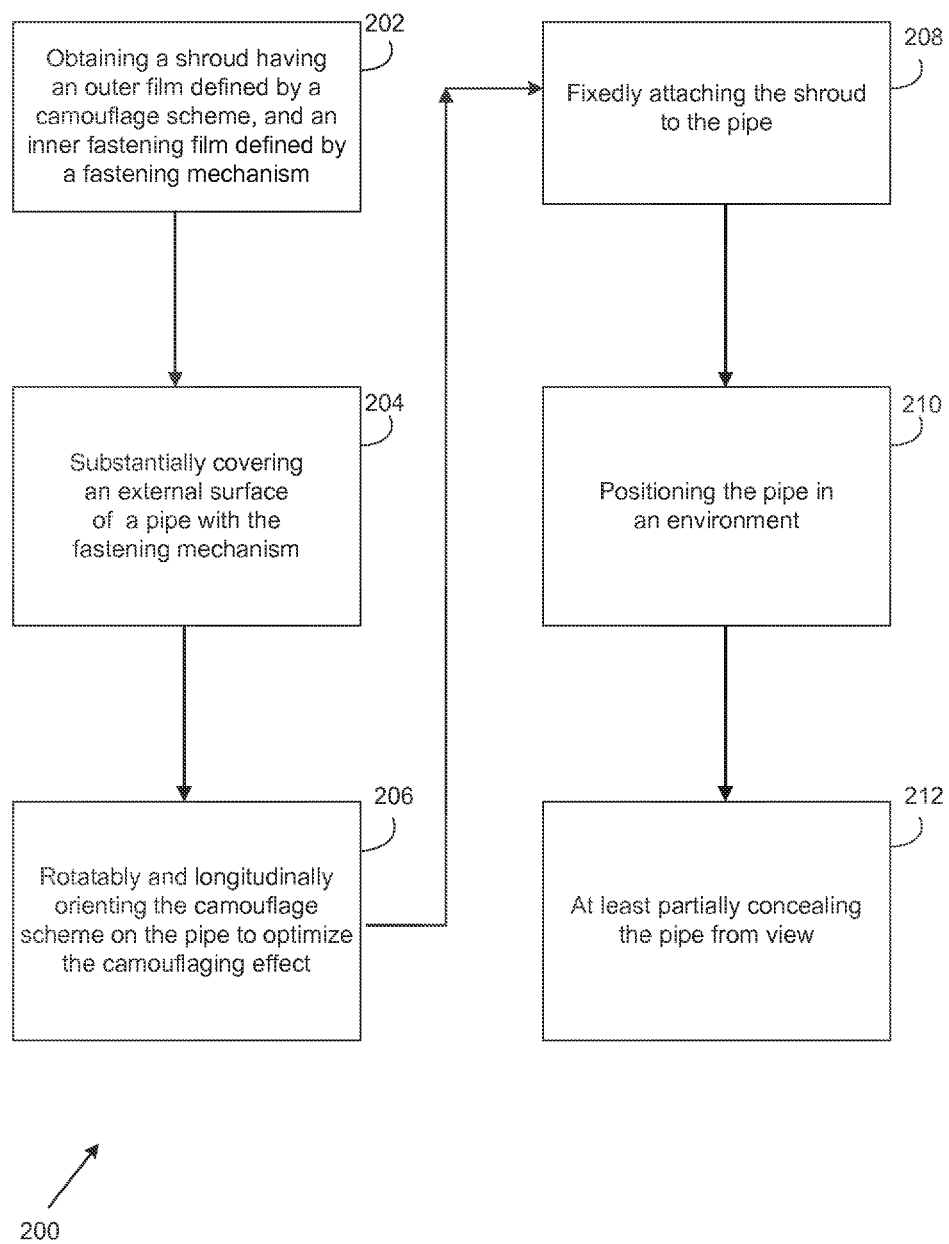
FIG. 5 illustrates a flowchart diagram of an exemplary method for fixedly covering a pipe with camouflage scheme, in accordance with an embodiment of the present invention.

In some embodiments, referenced in FIG. 5, a method 200 for fixedly integrating camouflage on a pipe 102 is configured to cover a pipe 102 with a camouflage scheme 108 such that the pipe 102 becomes less conspicuous by blending in with the environment 104. The method 200 includes an initial Step 202 of obtaining a shroud 100 having an outer film 112 defined by a camouflage scheme 108, and an inner fastening film 114 defined by a fastening mechanism 116.

In some embodiments, the method 200 may include a Step 204 of substantially covering an external surface of the pipe 102 with the fastening mechanism 116. The panel 110 has a generally resilient characteristic for facilitated conformance to variously sized and dimensioned pipes 102. The panel 110 may be configured to coil around the pipe 102. In other embodiments, the panel 110 may, however, be configured to slide onto the pipe 102, like a sleeve.

A Step 206 comprises rotatably and longitudinally orienting the camouflage scheme 108 on the pipe 102 to optimize the camouflaging effect. The objective is to form a less conspicuous pipe 102. Thus, prior to fixedly attaching the shroud 100 to the pipe 102, the shroud 100 may be rotated to a desired orientation relative to the pipe 102.

A Step 208 includes fixedly attaching the shroud 100 to the pipe 102. The shroud 100 comprises an inner fastening film 114. The inner fastening film 114 fixedly overlays the inner surface of the panel 110, forming a coplanar arrangement. The inner fastening film 114 comprises a fastening mechanism 116 for enabling fixed attachment to the external surface of the pipe 102. Through the fastening mechanism 116, the shroud 100 may fixedly and securely attach to the pipe 102. In this manner, the shroud 100 is not easily detachable from the pipe 102.

A Step 210 comprises positioning the pipe 102 in an environment. In some embodiments, the pipe 102 may be positioned in a yard or garden area. The camouflage scheme helps hide the pipe 102 to create a more aesthetic environment 104, or for strategic purposes. A final Step 212 includes at least partially concealing the pipe 102 from view. The camouflage scheme 108 may include a color and/or pattern configured to visually blend the exterior surface of the pipe 102 into the environment 104, and thereby make the pipe 102 less conspicuous in the environment 104.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A shroud for fixedly covering a pipe with a camouflage scheme, the shroud comprising:
   a panel, the panel defined by an outer surface, an inner surface, top edge, a bottom edge, and a pair of sidewalls extending between the top edge and the bottom edge, wherein the panel is a thermoplastic shrink-wrap;
   an outer film, the outer film disposed to detachably overlay the outer surface of the panel, the outer film comprising a camouflage scheme, the camouflage scheme defined by a color and a pattern configured to create a visual effect; and
   an inner fastening film, the inner fastening film disposed to fixedly overlay the inner surface of the panel, the inner fastening film comprising a fastening mechanism configured for enabling fixed attachment.

2. The shroud of claim 1, wherein the shroud is configured to substantially encapsulate a pipe.

3. The shroud of claim 2, wherein the pipe comprises an external surface, the external surface defined by an external fastener configured to mate with the fastening mechanism of the inner fastening film.

4. The shroud of claim 3, wherein the material composition of the pipe includes at least one member selected from the group consisting of: polyvinyl chloride (PVC), ductile iron, steel, cast iron, polypropylene, polyethylene, copper, and lead.

5. The shroud of claim 1, wherein the panel includes at least one member selected from the group consisting of: vinyl, polyvinyl chloride, rubber, flexible polymers, and a cloth tape coated with a poly-ethylene resin.

6. The shroud of claim 1, wherein the camouflage scheme is a mottled, camouflage pattern.

7. The shroud of claim 1, wherein the camouflage scheme substantially corresponds to an environment.

8. The shroud of claim 1, wherein the fastening mechanism includes at least one member selected from the group consisting of: hook and loop fasteners, magnets, adhesives, screws, and frictional fittings.

9. A shroud for fixedly covering a pipe with a camouflage scheme, the shroud comprising:
   a panel, the panel defined by an outer surface, an inner surface, top edge, a bottom edge, and a pair of sidewalls extending between the top edge and the bottom edge, wherein the panel is a thermoplastic shrink-wrap;
   an outer film, the outer film disposed to detachably overlay the outer surface of the panel, the outer film comprising a camouflage scheme, the camouflage scheme defined by a color and a pattern configured to create a visual effect; and
   an inner fastening film, the inner fastening film disposed to fixedly overlay the inner surface of the panel, the inner fastening film comprising an adhesive configured for enabling fixed attachment.

10. The shroud of claim 9, wherein the shroud is configured to substantially encapsulate a pipe.

11. The shroud of claim 10, wherein the pipe comprises an external surface, the external surface configured to adhere to the adhesive.

12. The shroud of claim 9, wherein the panel includes at least one member selected from the group consisting of: vinyl, polyvinyl chloride, rubber, flexible polymers, and a cloth tape coated with a poly-ethylene resin.

13. The shroud of claim 9, wherein the camouflage scheme is a mottled, camouflage pattern.

14. The shroud of claim 9, wherein the camouflage scheme is applied on the pipe with a hydro dipping method.

* * * * *